United States Patent [19]

Scragg

[11] 4,025,051
[45] May 24, 1977

[54] FLUID FLOW CONTROL VALVE

[76] Inventor: Edgar Peter Scragg, 60 Mulder St., Florida Park Extension 3, Florida, Transvaal, South Africa

[22] Filed: Sept. 4, 1975

[21] Appl. No.: 610,492

Related U.S. Application Data

[63] Continuation of Ser. No. 426,994, Dec. 20, 1973, abandoned.

[30] Foreign Application Priority Data

Jan. 9, 1973 South Africa ............... 73/0159
May 25, 1973 South Africa ............... 73/3577

[52] U.S. Cl. ................... 251/335 A; 251/318; 239/562
[51] Int. Cl.² ............... F16K 31/00; F16K 41/12
[58] Field of Search ............ 251/335 A, 61, 318

[56] References Cited

UNITED STATES PATENTS

| | | | |
|---|---|---|---|
| 1,291,869 | 1/1919 | Heeley | 251/335 A |
| 2,215,375 | 9/1940 | Ortman | 251/335 A |
| 2,506,140 | 5/1950 | Delaney | 251/335 A |
| 2,702,519 | 2/1955 | De Poutiloff | 251/335 A |
| 2,734,773 | 2/1956 | Ivins | 251/335 A |
| 3,626,978 | 12/1971 | Hoekstra | 29/157.1 R |
| 3,835,646 | 9/1974 | Ranft et al. | 251/335 A |

FOREIGN PATENTS OR APPLICATIONS

| | | | |
|---|---|---|---|
| 560,640 | 7/1958 | Canada | 251/335 A |
| 922,141 | 6/1949 | Germany | 251/335 A |
| 632,330 | 6/1960 | Italy | 251/335 A |
| 102,732 | 8/1941 | Sweden | 251/335 A |
| 616,280 | 12/1945 | United Kingdom | 251/335 A |

Primary Examiner—William R. Cline
Assistant Examiner—H. Jay Spiegel
Attorney, Agent, or Firm—Ladas, Parry, Von Gehr, Goldsmith & Deschamps

[57] ABSTRACT

A valve is disclosed which controls flow of fluid through its body from inlet to outlet, and which has a co-operating valve seat and valve closure member. The closure member is actuated by an operating element which comprises an integral stem and diaphragm, the stem projecting from both faces of the diaphragm. One stem part is connected to the closure member and the other part is free and acts as the actuating member. The diaphragm is secured in and seals the aperture through which the stem projects from the valve body. Heat-sealing of the periphery of the diaphragm to the bounding wall of the aperture is disclosed, and the stem can be stiffened by a metal rod embedded therein. The diaphragm is distorted and acts as a pivot for the stem when the free part of the stem is displaced. The valve is disclosed as forming part of an air-gun and as part of a bath shower unit.

8 Claims, 7 Drawing Figures

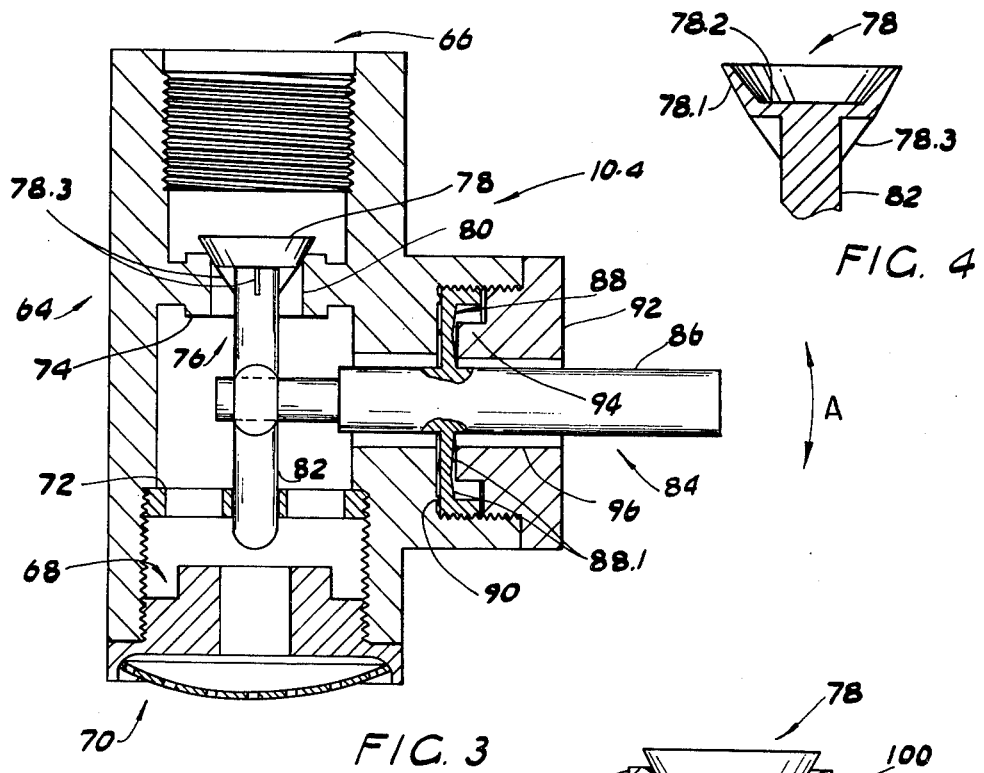
FIG. 3
FIG. 4
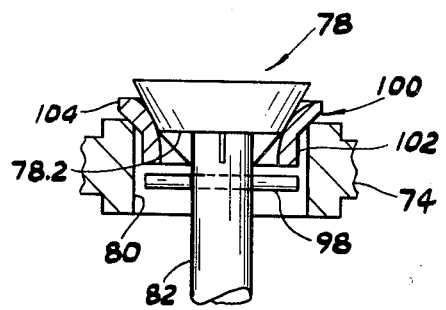
FIG. 5
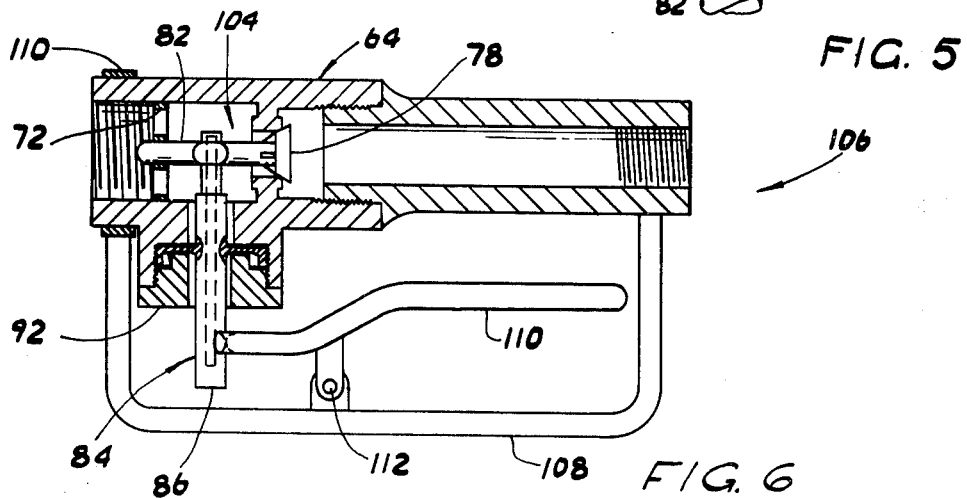
FIG. 6

FLUID FLOW CONTROL VALVE

This is a continuation of application Ser. No. 426,994 filed Dec. 20, 1973 and now abandoned.

This invention relates to fluid flow control values.

According to the present invention there is provided a fluid flow control valve comprising a valve body having an inlet and an outlet, a valve seat, a valve closure member co-operating with said seat for closing-off the inlet from the outlet, and a valve operating member projecting from said body through an aperture therein, said operating member comprising a flexible diaphragm and a stem, said stem being attached, on one side of said diaphragm, to said valve closure member and on the other side of the diaphragm projecting therefrom to constitute an operating element the outer end of which can be displaced generally parallel to the plane of the diaphragm to distort the diaphragm and displace said closure member with respect to the seat, said diaphragm sealing said aperture.

Said diaphragm can be threaded on its outer periphery and said aperture can be bounded by a threaded wall, the valve operating member being screwed into said aperture.

Preferably, said aperture is constituted by a bore having parts of different diameters with an axially facing surface there between, said diaphragm being in the larger bore part abutting said surface between the bore parts.

In one form, said projecting part of the stem passes through an oversized aperture which limits movement thereof. Said aperture can be elongated in form to guide movement of the stem while limiting movement thereof laterally of the direction of elongation of the aperture. In a modified form, said projecting part of the stem passes through an aperture in a rotatable element, said aperture being eccentric with respect to the axis of rotation of said element.

The diaphragm preferably has a circular region which is spaced radially inwardly from its outer periphery and radially outwardly from said stem and at which region it is thinner than it is both radially inwardly and radially outwardly of said region.

Additionally the valve may include a diaphragm supporting element in said aperture and close to the outwardly facing surface of the diaphragm for engagement by the diaphragm, thereby to support the same, should the diaphragm bulge under the influence of the pressure in said body.

In a specific constructional form said body includes a main passage and a subsidiary passage which are at right angles to one another, opposite ends of the main passage constituting the inlet and oulet of the valve, and the subsidiary passage opening into the main passage intermediate its ends and constituting said aperture, said valve closure member being guided for movement along said main passage.

For a better understanding of the present invention, and to show how the same may be carried into effect, reference will now be made, by way of example, to the accompanying drawings in which embodiments of the invention are illustrated and in which:

FIG. 3 is a vertical section through a further fluid flow control valve;

FIG. 4 is a section through the head of a valve member of the valve of FIG. 3;

FIG. 5 is a section through a double valve seat; and

FIG. 6 illustrates a "gun" for switching on and off flow of a fluid through a pipe.

Figure 1:
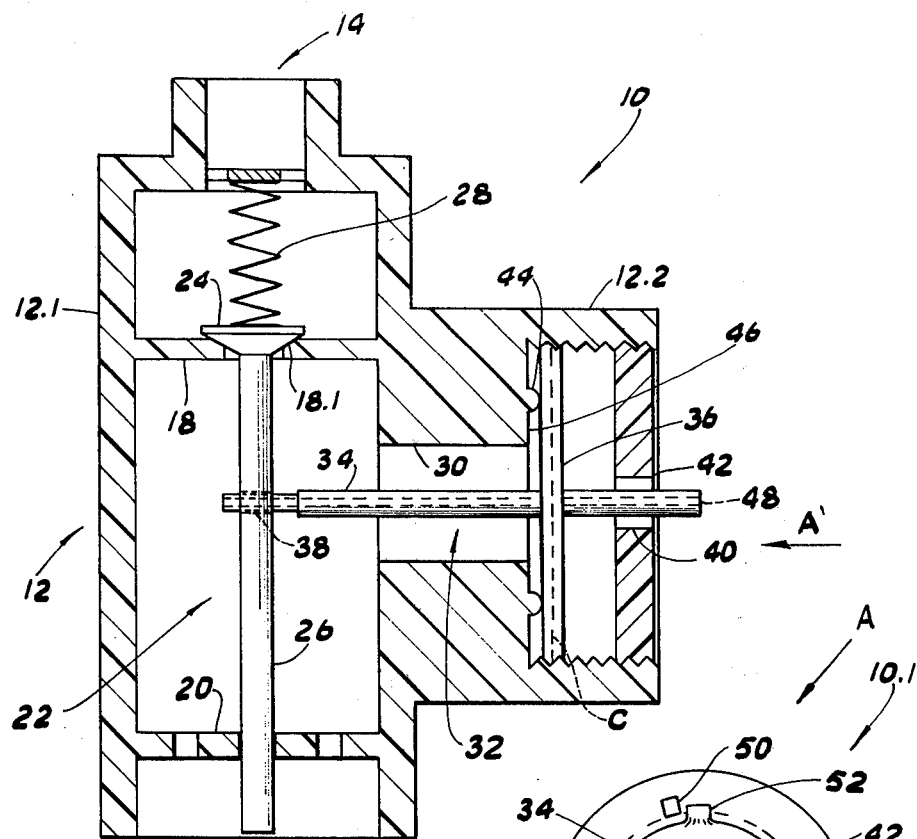
FIG. 1 is a vertical section through a fluid flow control valve.

The fluid flow control valve illustrated in FIG. 1 is generally referenced 10 and comprises a body 12 which is shown as one piece but which, in practice, to facilitate manufacture, is composed of two or more moulded or machined parts suitably secured together.

The body 12 has a fluid inlet 14 and a fluid outlet 16, there being between the inlet and outlet a transverse partition 18 and a perforated guide plate 20. The partition 18 has a bore therein, the upper part of which is downwardly tapering and the surface of which forms a valve seat 18.1. A valve closure member 22, which passes through the bore in the partition 18, has a frusto-conical or otherwise suitably shaped head 24 which co-operates with the valve seat 18.1. The member 22 also has a stem 26 which passes through a central aperture in the plate 20 so as to guide movements of the member 22. A spring 28 acts on the head 24 to urge the valve closure member 22 to its closed position.

The inlet 14 and outlet 16 are at the opposite ends of a main passage in a generally cylindrical part 12.1 of the body 12. The remainder of the body, referenced 12.2, is also cylindrical in form and its axis is at right angles to the axis of the part 12.1. An aperture, in the form of a bore 30, is formed in the body 12. The bore 30 of the part 12.2 constitutes a subsidiary passage which is at right angles to the main passage and which opens into the bore of the part 12.1 between the partition 18 and plate 20.

As will clearly be seen from FIG. 1 the bore 30 is stepped so as to provide a small diameter inner part and a threaded, large diameter outer part.

A valve-operating member, generally indicated at 32, comprise a stem 34 and a flexible diaphragm 36. The diaphragm 36 and stem 34 are integral with one another and can be machined from a single piece of stock. Preferably, however, they are moulded in one piece. The member 32 projects from the body 12 through the aperture constituted by the bore 30.

The diaphragm can be reinforced with cotton or synthetic materials C to improve its resistance to bursting under high pressure and to enable it is withstand the stresses imposed thereon when, in use, it acts as a pivot for the stem 34.

On one side of the diaphragm, the end of the stem 34 is entered in a transverse bore 38 of the stem 26, and on the other side the stem 34 passes through an oversized central aperture 40 in a plug 42 which is screwed into the large diameter part of the tapped bore 30. If desired, the aperture 40 can be vertically elongated in form and act to guide vertical movements of the stem 34 thus eliminating the possibility of the stem being forced sideways in an undesirable manner. The circular outer periphery of the diaphragm 30 is threaded to enable the varied-operating member 32 to be screwed into said large diameter part and when the member 32 is screwed into place it seals the aperture constituted by the bore 30.

A raised, circular rib 44 (greatly exaggerated in FIG. 1) is provided on the flat surface 46 formed by virtue of the step in the bore 30. The member 32 is screwed into the bore so that the diaphragm 36 is in the larger bore part with its lefthand face in contact with the rib. Hence the smaller part of the bore is sealed-off from the larger along a circular zone.

The rib 44 and diaphragm 36 can, if desired, be of synthetic plastics material and heat-sealed together so as further to minimisc the risk of leakage. Furthermore, the periphery of the diaphragm 36 can be heat-sealed to the body part 12.2.

In use of the value of FIG. 1, opening is effected by forcing the righthand end of the stem 34 downwardly generally parallel to the plane of the diaphragm (see arrow A) so as to distort the diaphragm 36 and displace the member 22 with respect to its seat. Movement of the stem 34 is limited to a degree determined by the size of the aperture 40. The lefthand end of the stem 34 lifts the member 22 so that the head 24 moves upwardly away from the co-operating seat. During this movement, the diaphragm is distorted and the inherent resilient of the material thereof results in there being a restoring force present which returns the member 32 to its central position as soon as it is released. In this position, the inlet is closed-off from the outlet.

If desired, a metal rod 48 can be embedded in the stem 34 during moulding, the metal rod passing through the diaphragm 36 and extending the full length (or substantially the full length) of the stem 34.

The valve illustrated in FIG. 1, as explained, is normally closed. If it is desired that the valve be normally open, the direction of flow is reversed and the spring 28 removed. Inlet pressure now holds the valve open and it can be temporarily closed by acting upwardly on the free end of the stem 34. It will be understood that it is perferable for the diaphragm to be unstressed while the valve is in its normal condition regardless of whether this normal condition is open or closed. This can be achieved in the particular constructional form under consideration by displacing the partition 18 "downwardly" (as viewed in FIG. 1) while leaving the remaining parts in the relative positions illustrated, or by lengthening the part of the stem 26 between the head 24 and the bore 38 to lift the head 24 away from its seat.

The aperture 40 can, if desired, be eccentric with respect to the center of the plug 42 (see valve 10.1 of FIG. 1A) and the plug 42 can be rotatably mounted in the body part 12.2. In this form, opening and closing of the valve is effected by rotating the plug so that the aperture 40 travels along an arcuate path P carrying the stem 34 with it. Two stops 50 carried by the body part 12.2 cooperate with two stops 52 carried by the plug 42 to limit rotational movement of the plug 42. The plug 42 in this form, instead of screwing into the prt 12.2, can be pushed axially into the bore 30 and the bore and plug can be provided with ribs and grooves 54 which snap-engages to leave the plug 42 free to rotate but incapable of axial movement. By turning the plug 42 through almost 180°, the valve is displaced from fully closed to fully opened or vice-versa.

If desired, one stop 50 and one stop 52 can be omitted so that the plug 42 is free to turn through almost 360°. In this form, a complete turn displaces the valve from fully closed to fully open and back to fully closed (or vice-versa).

Figure 1A:
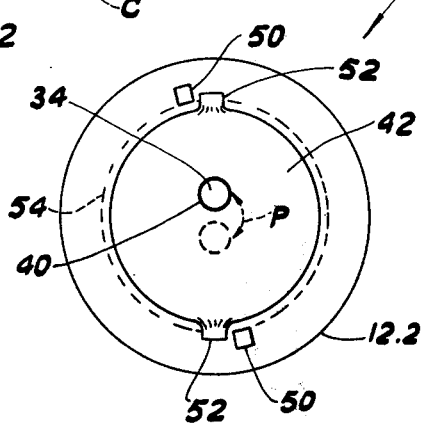
FIG. 1A is a view taken in the direction of arrow A' in FIG. 1 and showing a modified form of value.

The requisite eccentricity of the aperture 40 is greatly exaggerated in FIG. 1A.

In the event that the valve is closed, or closes, suddenly there is the possibility that hammer will be created in the supply line. To minimise this possibility, the partition 18 can be made as thin and flexible as possible consistent with it being sufficiently strong to resist failure under the applied pressures. A shock pressure created on closing bulges the partition 18 thereby increasing the size tends to cause the shock to be dissipated in the valve instead of traveling along the supply pipe.

Figure 2:
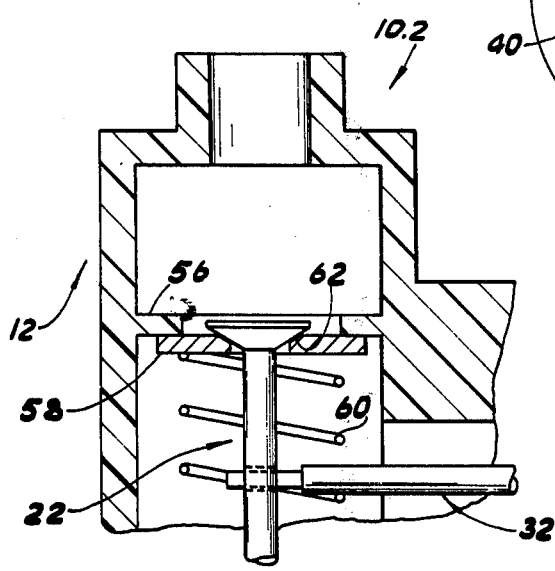
FIG. 2 illustrates a modified form of value seat structure.

In FIG. 2, there is illustrated part of the body 12 and the valve closure member 22 of a modified form of valve 10.2. In this constructional form, the partition 18 has been replaced by an inwardly projecting circumferential abutment 56 and a loose element 58 which is urged against the abutment 56 by a spring 60. The seat for the member 22 is formed by a tapered bore 62 in the element 58. Upon sudden closure of the valve, and hence the creation of a shock pressure in the inlet chamber, the element 58 lifts away from the abutment 50 so that the shock is able to pass to the downstream side of the valve.

The member 22 is connected to the valve-operating member 32 in the manner illustrated in FIG. 1 and is actuated in the same way.

In FIG. 3, a valve 10.4 substantially of the form shown in FIG. 1 is illustrated in the arrangement it adopts when incorporated in a shower unit. The valve 10.4 comprises a body 64 substantially identical to the body 12, the inlet to the body being at 66 and the outlet 68 being internally threaded to receive a shower rose 70. A valve of the form shown in any of the other Figures could also be employed.

The plate 20 of FIG. 1 is replaced by a screwed-in guide plate 72 and the partition 74 is of a somewhat different configuration to the partition 18 of FIG. 1.

The valve closure member 76 has a head 78 (which will be described with reference to FIG. 4), and which co-operates with the valve seat formed by the bore 80 in the partition 74. The member 74 also has a stem 82 which passes through a central aperture in the plate 72 so as to guide movement of the member 76. The head 78, as will be seen from FIG. 4, comprises a thin walled skirt 78.1 of generally frusto-conical form which is joined by a base 78.2 to the stem 82. The skirt is deformable and, in use, is forced outwards by pressure at the inlet 66 to compensate for any slight ovality in the seat. Four guide vanes 78.3 are provided to ensure that the head 78 cannot become misaligned with the bore 80 and be prevented from closing.

The valve operating member of the valve 10.4 is referenced 84 and it will be noted that it includes a stem 86 and a diaphragm 88. The diaphragm abuts a circular rib 90, equivalent to the rib 44, and can be secured (by heat sealing) both to this rib and to the valve body 64. On its outwardly directed face, the diaphragm 88 is radiussed around its inner and outer peipheries so as to provide a portion which is spaced radially inwardly from its outer periphery and radially outwardly from the stem and at which region it is thinner than at other regions. The rear face of the diaphragm is flat. These radiussed portions are referenced 88.1 and serve to strengthen the diaphragm and also ensure that bending occurs in the thinner, central region. Said portions are exaggerated in FIG. 3 so as clearly to be visible.

The circular outer periphery of the diaphragm 88 is threaded so that the valve-operating member 84 can be screwed in ahead of a plug 92. The plug has an extension 94 which is close to the diaphragm and which serves to support it should it bulge under high pressure conditions. The plug 92 is in other respects similar to the plug 42 and has an oversized central aperture 96 through which the stem 86 passes.

When the stem 86 is actuated (see arrow A), the stem and the part of the diaphragm inwardly of its thinner part move, the outer part of the diaphragm remaining virtually stationary.

Turning now to FIG. 5, the stem 82 is shown as having a transverse pin 98 a short distance below the base 78.2. A secondary valve closure and seat element 100 is located between the pin 98 and the base 78.2. The element 100 has a lower cylindrical portion 102 integral with a short frusto-conical skirt 104. The internal surface of the skirt 104 forms a seat for the head 78 and its external surface seats on the valve seat formed by the priphery of the bore 80 in the partition 74.

There is a slight gap between the pin 98 and the element 100 so that the stem 82 must rise through a short distance before the pin 98 engages the element 100 and unseats it. The head 78 thus constitutes a pilot valve which opens slightly before the main valve element 100 lifts form its seat. The operating force which must be exerted on the stem 82 is reduced with respect to that required to open the valve when it is constructed as shown in FIGS. 1 and 3.

The gun 106 shown in FIG. 6 includes a valve 104 of the form shown in FIG. 3, and hence previously described parts have been designated with the same reference numerals. These parts will not be described again. In this constructional form the valve serves to control fluid flow through a line e.g. a compressed air line (not shown) into which the gun is connected. The valve body 64 is extended rearwardly by a tubular section 106 with which a combined guard and pivot carrying member 108 is integral. The member 108 carries a ring 110 at its free end and this ring fits around the body 64. Air pipes (not shown) are connected to the internally threaded rear end of the section 106 and to the internally threaded outlet 68 of the body 64. A lever 110 is pivotally carried by the guard member 108, the pivotal connection being designated 112 and the lever being attached to the stem 86.

The operator places his fingers between the major part of the lever 110 and guard member 108 and, to open the valve, squeezes the lever 110 towards the section 106. This causes a slight forward movement of the minor parts of the lever, and hence the stem 86 pivots with the diaphragm acting as pivot. The valve stem 82 moves to the right so that the head 78 lifts off its seat.

The valve of any of the Figures, such as FIG. 1 1A and 2 could be employed in the gun.

It will be understood that a stiffening rod of metal or other material need only be embedded in the stem of the valve operating member if the stem does not itself possess sufficient rigidity to remain virtually straight when the end thereof which projects from the valve body is displaced.

What I claim is:

1. A fluid flow control valve comprising a valve body, having an inlet and an outlet, a valve seat, a valve closure member co-operating with said seat for closing off the inlet from the outlet, said valve closure member being between said valve seat and said inlet and being biased into sealing contact with said seat, an aperture in said body, said aperture being bounded by a peripheral wall, and a valve-operating member of synthetic plastics material projecting from said body through said aperture, said operating member comprising a relatively stiff, disc-like flexible diaphragm and a stem integral with the diaphragm, positioned centrally thereof and projecting in both directions therefrom, an annular peripheral part of said diaphragm, and an annular inner part, said diaphragm adjacent to and encircling said stem, being thicker than a circumferentially extending region which lies between said peripheral part and said inner part, said diaphragm engaging said peripheral wall whereby the diaphragm seals said aperture, said region of the diaphragm, said stem and said inner part of the diaphragm being spaced from said body, and said stem and inner part being displaceable with respect to said peripheral part, said stem being attached, on one side of the diaphragm, to said valve closure member and on the other side of the diaphragm constituting an operating element the outer end of which can be displaced generally parallel to the plane of the diaphragm so as to pivot about a point located substantially in the medial plane between the faces of the diaphragm and displace said closure member with respect to the seat, the resultant distortion of the inner part of the diaphragm with respect to said peripheral part at said region creating a restoring force.

2. A fluid flow control valve according to claim 1 in which said aperture is constituted by a bore having parts of different diameters with an axially facing surface therebetween, said diaphragm being in the larger bore part and said peripheral part of the diaphragm abutting said surface between the bore parts.

3. A valve according to claim 1, in which said body is also of synthetic plastics material, the diaphragm being secured to the body by heat sealing.

4. A valve according to claim 1, and including a diaphragm-supporting element in said aperture and close to the outwardly surface of said annular inner part of said diaphragm for engagement therewith, thereby to support the same, should the annular inner part bulge under the influence of the pressure in said body.

5. A valve according to claim 4 in which said diaphragm-supporting element has an aperture therein through which said part of the stem on said other side of the diaphragm passes, this aperture limiting movement of the stem.

6. A valve according to claim 1, in which said body includes a main passage and a subsidiary passage which are at right angles to one another, opposite ends of the main passage constituting the inlet and outlet of the valve, and the subsidiary passage opening into the main passage intermediate its ends and constituting said aperture, said valve closure member being guided for movement along said main passage.

7. A gun for controlling flow of fluid through a line comprising a valve according to claim 1, and a pivotally mounted trigger constituted by a lever of the first order, the lever being pivotally mounted on a triger guard and connected to said outer end of said stem for displacing such outer end in the direction generally parallel to the plane of the diaphragm.

8. A fluid flow control valve comprising a valve body having an inlet and an outlet, a valve seat, a valve closure member co-operating with said seat for closing off the inlet from the outlet, an aperture in said body, said aperture being bounded by a threaded peripheral wall, and a valve-operating member of synthetic plastics material projecting from said body through said aperture, said operating member comprising a relatively stiff, disc-like flexible diaphragm which is threaded on its outer periphery and a stem integral with the diaphragm, positioned centrally thereof and projecting in both directions therefrom, an annular peripheral part of said diaphragm, and an annular inner part of said diaphragm adjacent to and encircling said stem, being thicker than a circumferentially extending region which lies between said peripheral part and said inner part, said diaphragm being screwed into said aperture ad engaging said peripheral wall whereby the diaphragm seals said aperture, said region of the diaphragm, said stem and said inner part of the diaphragm being spaced from said body, and said stem and inner part being displaceable with respect to said peripheral part, said stem being attached, on one side of the diaphragm, to said valve closure member and on the other side of the diaphragm constituting an operating element the outer end of which can be displaced generally parallel to the plane of the diaphragm so as to pivot about a point located substantially in the medial plane between the faces of the diaphragm and displace said closure member with respect to the seat, the resultant distortion of the inner part of the diaphragm with respect to said peripheral part at said region creating a restoring force.

* * * * *